US008321277B2

(12) United States Patent
Coulomb et al.

(10) Patent No.: US 8,321,277 B2
(45) Date of Patent: Nov. 27, 2012

(54) METHOD AND SYSTEM FOR VOICE ORDERING UTILIZING PRODUCT INFORMATION

(75) Inventors: Beatrice Coulomb, Cagnes sur mer (FR); Dimitris Gibault, Cagnes sur mer (FR); Audrey Occello, Colomars (FR); Christophe Palaysi, Villeneuve Loubet (FR)

(73) Assignee: Nuance Communications, Inc., Burlington, MA (US)

( * ) Notice: Subject to any disclaimer, the term of this patent is extended or adjusted under 35 U.S.C. 154(b) by 1047 days.

(21) Appl. No.: 12/164,633

(22) Filed: Jun. 30, 2008

(65) Prior Publication Data

US 2009/0319272 A1   Dec. 24, 2009

(51) Int. Cl.
*G06Q 30/00*   (2006.01)
(52) U.S. Cl. ............... 705/14.44; 705/14.55; 705/14.51; 705/14.25; 705/14.36; 704/270.1; 704/275; 707/999.01
(58) Field of Classification Search .................. 704/270, 704/270.1, 275, 251, 231, 239, 254, 234, 704/257, 233; 379/88.03, 88.01, 88.04, 88.17; 707/999.01, 999.003, 999.006, 790; 705/14.64, 705/39, 14.44, 14.55, 14.23, 14.25, 14.36, 705/14.51
See application file for complete search history.

(56) References Cited

U.S. PATENT DOCUMENTS

| | | | |
|---|---|---|---|
| 5,315,688 A * | 5/1994 | Theis ............................ 704/233 |
| 5,329,609 A * | 7/1994 | Sanada et al. .................. 704/251 |
| 5,682,539 A * | 10/1997 | Conrad et al. ..................... 704/9 |
| 6,182,046 B1 * | 1/2001 | Ortega et al. .................. 704/275 |
| 6,192,337 B1 * | 2/2001 | Ittycheriah et al. ........... 704/231 |
| 6,249,765 B1 * | 6/2001 | Adler et al. .................... 704/500 |
| 6,347,300 B1 | 2/2002 | Minematsu |
| 6,421,672 B1 * | 7/2002 | McAllister et al. ................... 1/1 |
| 6,625,595 B1 * | 9/2003 | Anderson et al. ..................... 1/1 |
| 6,934,684 B2 * | 8/2005 | Alpdemir et al. ............. 704/265 |
| 7,058,565 B2 | 6/2006 | Gusler et al. |
| 7,110,963 B2 | 9/2006 | Negreiro |
| 7,386,540 B2 * | 6/2008 | Anderson et al. ..................... 1/1 |
| 7,505,568 B2 * | 3/2009 | Simpson et al. ........... 379/88.01 |
| 7,840,407 B2 * | 11/2010 | Strope et al. .................. 704/257 |
| 7,958,151 B2 * | 6/2011 | Basner .......................... 707/790 |
| 2002/0143550 A1 | 10/2002 | Nakatsuyama |
| 2005/0165648 A1 | 7/2005 | Razumov |
| 2006/0047647 A1 | 3/2006 | Kuboyama et al. |
| 2009/0222329 A1 * | 9/2009 | Ramer et al. .................... 705/10 |

* cited by examiner

*Primary Examiner* — Vijay B Chawan
(74) *Attorney, Agent, or Firm* — Wolf, Greenfield & Sacks, P.C.

(57) ABSTRACT

A method for voice ordering utilizing catalog taxonomies and hierarchical categorization relationships in product information management (PIM) systems includes: prompting a user with a query to input speech into a speech recognition engine; translating the inputted speech into a series of words; querying a product information management component (PIM) based on the series of words; wherein the querying is performed as a matching algorithm against PIM category and attribute keywords; returning coded results to a voice synthesizer to produce at least one of: a voice response, and a text response to the user; and wherein in the coded results indicate one or more of: a not found message for zero matches, a confirmation of a suitable single match, a request for additional information in the event one or more of the following occurs: more than one matching item, category, and item attribute was found in the PIM.

20 Claims, 3 Drawing Sheets

METHOD AND SYSTEM FOR VOICE ORDERING UTILIZING PRODUCT INFORMATION

This application claims priority to European Patent Application No. 08305276.1, filed 18 Jun. 2008, and all the benefits accruing therefrom under 35 U.S.C. §119, the contents of which in its entirety are herein incorporated by reference.

BACKGROUND OF THE INVENTION

1. Field of the Invention

The present invention relates generally to speech recognition and, more particularly, to a method, article, and system for an advanced voice ordering utilizing product information.

2. Description of the Related Art

Speech recognition (also known as automatic speech recognition or computer speech recognition) converts spoken words to machine-readable input (for example, to binary code for a string of character codes). The term "voice recognition" may also be used to refer to speech recognition, but more precisely refers to speaker recognition, which attempts to identify the person speaking, as opposed to what is being said. Speech recognition applications include voice dialing (e.g., "Call home"), call routing (e.g., "I would like to make a collect call"), appliance control, content-based spoken audio search (e.g., find a podcast where particular words were spoken), simple data entry (e.g., entering a credit card number), preparation of structured documents (e.g., a radiology report), speech-to-text processing (e.g., word processors or emails), and in aircraft cockpits (usually termed Direct Voice Input).

Speech pattern matching involves the matching of characteristic parameters extracted from an incoming test speech signal with those of a collection of pre-recorded reference speech templates. Keyword spotting, speech recognition, and speaker detection are typical tasks that employ speech pattern matching techniques for recognition or detection purposes. In keyword spotting and speech recognition tasks, the test speech sample and reference speech templates are uttered words, while speaker detection uses several seconds of individuals' voices In an automated conversational user interface (UI), speech recognition is employed to recognize information from large lists or databases such as a caller's telephone number, account number, their name, address, and zip code, etc. Speech recognition performance and the resulting user experience and levels of user satisfaction are critical driving factors to the successful deployment of automated conversational UI systems.

SUMMARY OF THE INVENTION

A method for improved voice ordering utilizing catalog taxonomies and hierarchical categorization relationships in product information management (PIM) systems, the method includes: prompting a user with a first query to input speech into a speech recognition engine; receiving the user's inputted speech; translating the inputted speech into a series of words; querying a product information management component (PIM) based on the series of words; wherein the querying is performed as a matching algorithm against PIM category and attribute keywords; returning coded results to a voice synthesizer to produce at least one of: a voice response, and a text response to the user; and wherein in the coded results indicate one or more of: a not found message for zero matches for an item in the PIM, a confirmation of a suitable single match of an item found in the PIM, a request for additional information from the user in the event one or more of the following occurs: more than one matching item, category, and item attribute was found in the PIM.

TECHNICAL EFFECTS

As a result of the summarized invention, a solution is technically achieved for a method, article, and system for utilizing catalog taxonomies to improve voice correlation and enhance voice recognition during voice ordering.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1A:
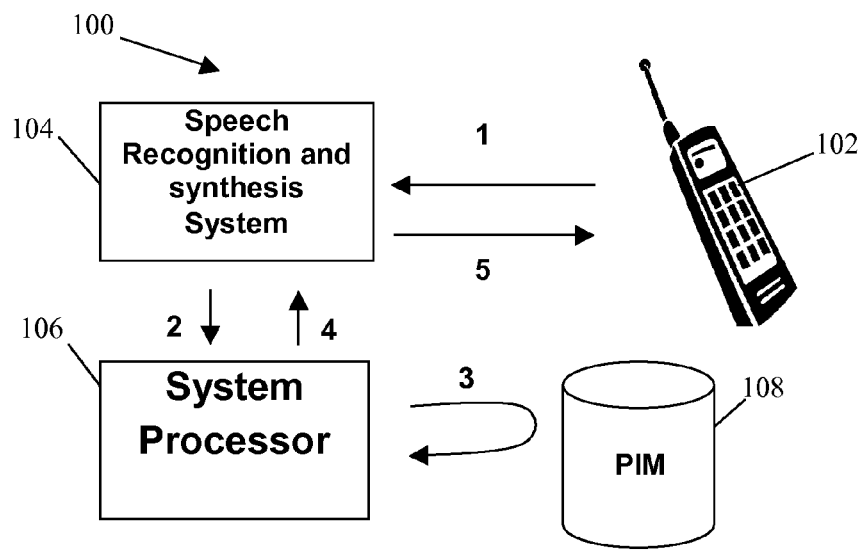
FIG. 1A is a functional system block diagram for carrying out embodiments of the invention.

The detailed description explains the preferred embodiments of the invention, together with advantages and features, by way of example with reference to the drawings.

DETAILED DESCRIPTION

Despite the advances in speech recognition, currently available voice ordering interfaces have proven to be unintuitive and lack reliability. Voice recognition has so far proven to be inefficient in retail contexts, and therefore voice recognition has so far achieved a low level of usage penetration in the retail sector. Although there are many available systems that provide voice ordering, utilizing real time, web and voice integration, these systems fail to leverage catalog structures and attributes.

Embodiments of the invention utilize catalog taxonomies to improve voice correlation and enhance voice recognition during voice ordering. Embodiments of the invention utilize existing word recognition and correlation techniques on a subset of predefined one-array keywords, and leverage retail product categorizations during a voice order transaction. Embodiments of the invention utilize specific item attributes in an error-handling context, in contrast to traditional voice recognition systems that utilize user repetition to obtain voice recognition. Embodiments of the invention request additional inputs, and based on the inputs attributes corrections are made to a misunderstood product. Embodiments of the invention are configured based on an advanced correlation between a product information management (PIM) system and speech recognition patterns.

Product information management refers to a product catalog, where information is utilized in varying environments and contexts, such as for detailed product descriptions with pricing information in product catalogs, or for size and weight data for calculating freight costs in a logistics department. PIM in embodiments of the invention represents a solution for centralized, media-independent data maintenance for providing purchasing, production, and communications data for repeated use on and in multiple information technology (IT) systems, languages, output media, and publications. PIM also provides a solution for efficient data collection, management, refinement, and output.

The following two examples illustrate the use of PIM for improving speech recognition during voice product ordering, and the interactive nature of embodiments of the invention In the first example, a consumer says "black berry," and an embodiment of the invention browses a catalog, and finds several items that fit under "black berry":

a. several in the soft drink category: "Black berry juice 1 liter", "Black berry juice no sugar 150 ml", . . . .
b. one in the alcoholic drink category: 'Black berry liquor 750 ml"
c. one in the fresh food category: black berry fruit
d. one in the electronic category: "Blackberry handheld"

Therefore the embodiment asks the consumer for complementary attribute information:

Consumer responds: "1-liter"

Continuing with the first example, the system of the embodiment realizes that 1-liter is a volume attribute that is only relevant to the drink category, and not the electronic or fresh food categories. Therefore, the system in this embodiment of the invention rejects the items contained in the electronic category, and in the fresh food category. Moreover, since the system embodiment does not find any item in the alcoholic category with 1-liter as a valid volume (black berry liquor only exists in 750 ml and 500 ml sizes), therefore the only product that could fit is black berry juice in a 1-liter container.

The first example clearly demonstrates that the embodiment of the invention is able to use both category information and attributes specifically attached to a given category to discern a customer's product order.

In a second example the consumer says "Alfa R 156" to an embodiment of the invention, and the embodiment responds to the consumer with "Alfa Protein 156 Pfazer". The consumer responds to the system embodiment, "No it's a car, 144 horsepower" The system embodiment responds with a new search in the "car" category with the attributes supplied by the consumer (i.e., 144 horsepower), and returns with "Alfa Romeo, 144, CV, 1.8 GTS" The second example further illustrates that embodiments of the invention is not a corrective algorithm based on repetition, but makes adjustments based on supplied attributes.

Figure 1B:
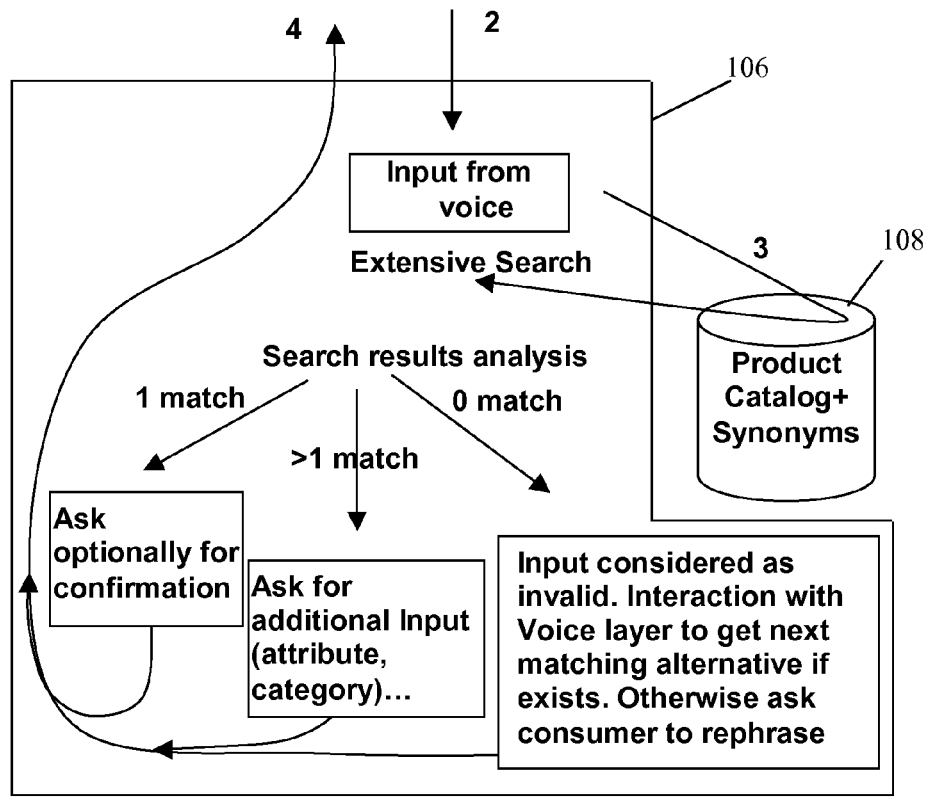
FIG. 1B is a functional diagram describing an algorithm for implementing embodiments of the invention.

FIGS. 1A and 1B are functional system and algorithmic block diagrams, respectively, for carrying out embodiments of the invention. In embodiments of the invention voice recognition and synthesis are two separate functional components in block 104. The speech recognition component obtains speech input (1) from a communication device 102, recognizes the phoneme and translates into words that are passed (2) to the system processor 106. The system processor 106 queries (3) the product information management component 108 based on the words from the speech recognition component of block 104. The PIM 108 contains product catalogs and product synonyms. The query (3) is performed as a matching algorithm against PIM category and attribute keywords. The system processor 106 returns coded results (4) to the voice synthesis component of block 104. The returned coded results (4) may be a confirmation of a suitable match (one match), a request for additional information (more than one match), or a not found message (zero matches). The voice synthesis component of block 104 translates the return coded results (4) into an audible speech (5) or text response for feedback to a user via communication device 102.

Figure 2A:
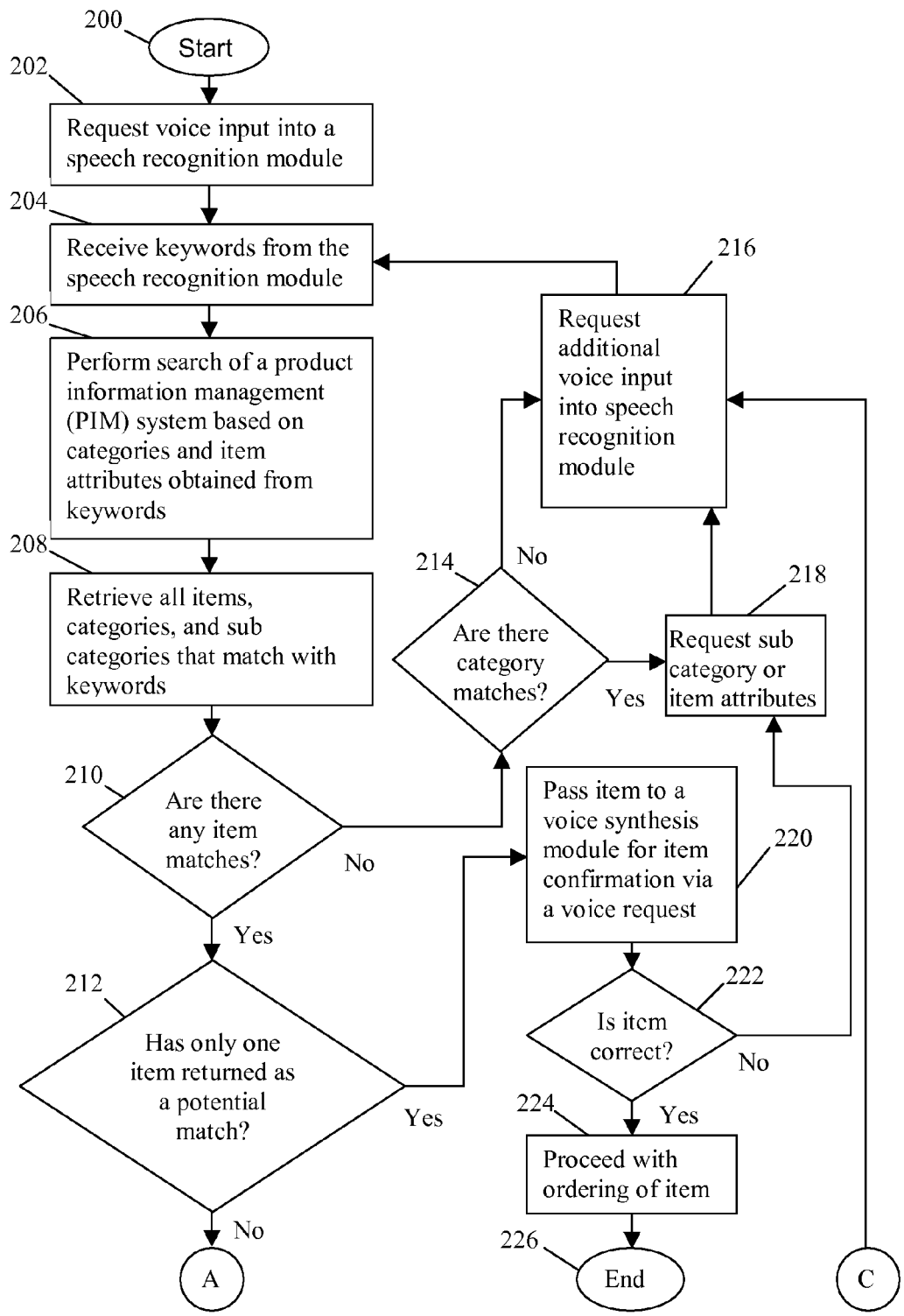
FIGS. 2A and 2B are a flow diagram illustrating the utilization catalog taxonomies to improve voice correlation and enhance voice recognition during voice ordering according to embodiments of the invention.
Figure 2B:
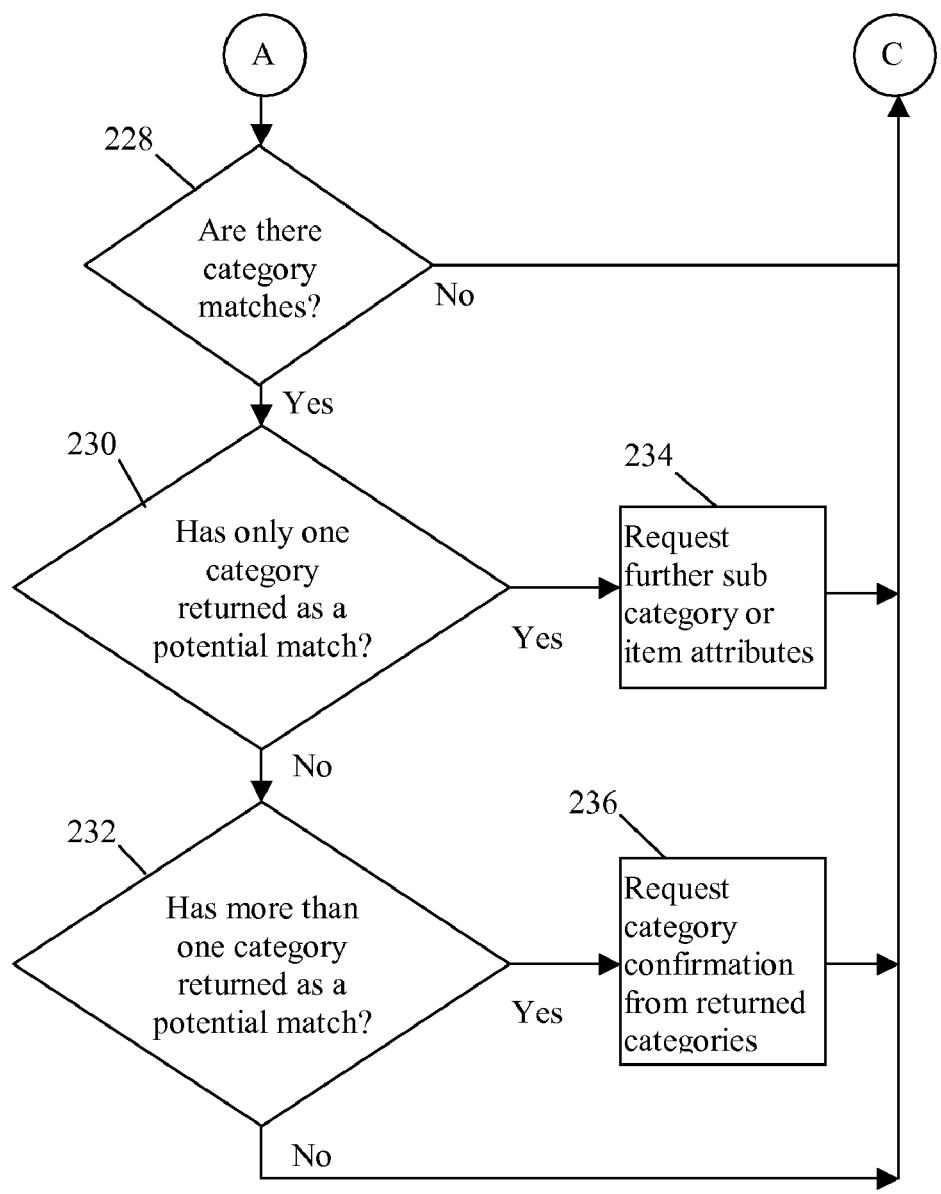

FIGS. 2A and 2B are a flow diagram illustrating the utilization of catalog taxonomies to improve voice correlation and enhance voice recognition during voice ordering, according to embodiments of the invention. The process starts (block 200) with a request for voice input for a speech recognition module (block 202), and receiving keywords obtained via the speech recognition module (block 204). The received keywords are utilized to perform a search of a product information management (PIM) system based on categories and item attributes obtained from the keywords (block 206). All items, categories, and sub categories that match with the keywords are retrieved (block 208).

It is noted that the objective of the search is to retrieve all items and/or categories that match with the searched keywords. The category/sub category, and item are organized in hierarchical structure. Each level in the hierarchical structure has its own attributes. The keywords follow the same hierarchical structure as the items in the catalog being searched. The relationships between the keywords are also taken into account during the search of the PIM.

Returning to the flow diagram of FIGS. 2A and 2B, a determination is made if there are any item matches from the search of the PIM (decision block 210). In the event there are no item matches (decision block 210 is No), a determination is made if there are any category matches (decision block 214). In the event there are no category matches (decision block 214 is No), an error message is generated by the system processor 106 to the voice synthesis component of block 104, to generate an additional request for voice inputs into the speech recognition module of block 104 (block 216), and the process continues at block 204. In the event there are category matches (decision block 214 is Yes), a request is generated by the system processor 106, for further sub category or item attributes (block 218) via the speech recognition module (block 216), and the process continues at block 204. In the event there is one potential item match (decision block 212 is Yes), the item's code is passed by the system processor 106 to the voice synthesis component of block 104, to generate a request for user confirmation of the matched item. In the event the identified matched item is incorrect (decision block 222 is No), a request is generated by the system processor 106 for further sub category or item attributes (block 218) via the speech recognition module (block 216), while keeping a record of the current results to be refined at the next interaction with the ordering user. In the event the identified item is correct (decision block 222 is Yes), the ordering process of the identified item proceeds (block 224), and the process ends (block 226). However, in the event more than one item is identified by the system processor 106 (decision block 212 is No), the process continues in FIG. 2B.

Continuing with the flow diagram of FIG. 2B, in the event there is more than one potential item match (decision block 212 is No), a determination is made if there are category matches corresponding to the item matches (decision block 228). In instances were there are no category matches corresponding to the items identified (decision block 228 is No), a request is generated by the system processor 106 for further user input via the speech recognition module (block 216). In instances were there are category matches corresponding to the items identified (decision block 228 is Yes), and only one category has been returned as a potential match (decision block 230 is Yes), a request for further sub category and item attributes is made (block 234) via the speech recognition module (block 216). In the event more than one category returned with more than one corresponding item (decision block 232 is Yes), a further request is made for a confirmation of a suitable category from the multiple categories returned (block 236) via the speech recognition module (block 216), and the process continues until the correct item is identified by the system processor 106.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for improved voice ordering from a product catalog using a product information management (PIM) component, the method comprising:
   receiving, from a speech recognition component, one or more words corresponding to a voice input;
   searching, by at least one processor, the PIM component to identify at least one matching item and/or category in the product catalog based, at least in part, on the one or more received words and at least one item attribute associated with at least one item and/or at least one category attribute associated with at least one category in the PIM component; and
   outputting coded results to a voice synthesis component in response to the search, wherein the coded results indicate whether the search resulted in the identification of at least one matching item and/or category in the PIM component.

2. The method of claim 1, wherein the PIM component is configured to organize items, categories, and sub categories in a hierarchical structure of levels, wherein at least some levels of the hierarchical structure are associated with one or more attributes, and wherein searching the PIM component comprises searching the PIM component based, at least in part, on the one or more attributes associated with the levels of the hierarchical structure.

3. The method of claim 1, wherein the coded results indicate that no matching items and no matching categories were identified and wherein the method further comprises instructing the voice synthesis component to generate an error message including a request for additional voice input from the user.

4. The method of claim 1, wherein the coded results indicate a single matching item was identified and wherein the method further comprises instructing the voice synthesis component to generate a request for confirmation of the single matching item from the user.

5. The method of claim 4, further comprising:
   receiving a response to the request for confirmation, wherein the response identifies the single matching item as correct; and
   continuing an ordering process for the single matching item.

6. The method of claim 4, further comprising:
   receiving a response to the request for confirmation, wherein the response identifies the single matching item as incorrect;
   instructing the voice synthesis component to generate a request for additional sub category and/or item attributes; and
   storing information related to the coded results including the identification of the single matching item.

7. The method of claim 1, wherein the coded results indicate multiple matching items were identified, wherein the method further comprises:
   determining if there are one or more matching categories corresponding to the matching items;
   instructing the voice synthesis component to generate a request for additional voice input from the user in response to determining there are no matching categories corresponding to the matching items;
   instructing the voice synthesis component to generate a request for subcategory and/or item attributes in response to determining that there is a single matching category corresponding to the matching items; and
   instructing the voice synthesis component to generate a request for confirmation of a suitable category in response to determining that there are multiple categories corresponding to the matching items.

8. A non-transitory computer readable medium encoded with a plurality of instructions that, when executed by a computer, perform a method comprising:
   receiving, from a speech recognition component, one or more words corresponding to a voice input;
   searching a product information management (PIM) component to identify at least one matching item and/or category in a product catalog based, at least in part, on the one or more received words and at least one item attribute associated with at least one item and/or at least one category attribute associated with at least one category in the PIM component; and
   outputting coded results to a voice synthesis component in response to the search, wherein the coded results indicate whether the search resulted in the identification of at least one matching item and/or category in the PIM component.

9. The computer-readable medium of claim 8, wherein the PIM component is configured to organize items, categories, and sub categories in a hierarchical structure of levels, wherein at least some levels of the hierarchical structure are associated with one or more attributes, and wherein searching the PIM component comprises searching the PIM component based, at least in part, on the one or more attributes associated with the levels of the hierarchical structure.

10. The computer-readable medium of claim 8, wherein the coded results indicate that no matching items and no matching categories were identified and wherein the method further comprises instructing the voice synthesis component to generate an error message including a request for additional voice input from the user.

11. The computer-readable medium of claim 8, wherein the coded results indicate a single matching item was identified and wherein the method further comprises instructing the voice synthesis component to generate a request for confirmation of the single matching item from the user.

12. The computer-readable medium of claim 11, wherein the method further comprises:
   receiving a response to the request for confirmation, wherein the response identifies the single matching item as correct; and
   continuing an ordering process for the single matching item.

13. The computer readable medium of claim 11, wherein the method further comprises:
   receiving a response to the request for confirmation, wherein the response identifies the single matching item as incorrect;
   instructing the voice synthesis component to generate a request for additional sub category and/or item attributes; and
   storing information related to the coded results including the identification of the single matching item.

14. The computer-readable medium of claim 8, wherein the coded results indicate multiple matching items were identified, wherein the method further comprises:
   determining if there are one or more matching categories corresponding to the matching items;
   instructing the voice synthesis component to generate a request for additional voice input from the user in response to determining there are no matching categories corresponding to the matching items;
   instructing the voice synthesis component to generate a request for subcategory and/or item attributes in response to determining that there is a single matching category corresponding to the matching items; and
   instructing the voice synthesis component to generate a request for confirmation of a suitable category in response to determining that there are multiple categories corresponding to the matching items.

15. An apparatus configured to search a product information management (PIM) component, the apparatus comprising:
   a system processor programmed to:
      receive, from a speech recognition component, one or more words corresponding to a voice input;
      search the PIM component to identify at least one matching item and/or category in a product catalog based, at least in part, on the one or more received words and at least one item attribute associated with at least one item and/or at least one category attribute associated with at least one category in the PIM component; and
      output coded results to a voice synthesis component in response to the search, wherein the coded results indicate whether the search resulted in the identification of at least one matching item and/or category in the PIM component.

16. The apparatus of claim 15, wherein the coded results indicate that no matching items and no matching categories were identified and wherein the system processor is further programmed to instruct the voice synthesis component to generate an error message including a request for additional voice input from the user.

17. The apparatus of claim 15, wherein the coded results indicate a single matching item was identified and wherein the system processor is further programmed to instruct the voice synthesis component to generate a request for confirmation of the single matching item from the user.

18. The apparatus of claim 17, wherein the system processor is further programmed to:
   receive a response to the request for confirmation, wherein the response identifies the single matching item as correct; and
   continue an ordering process for the single matching item.

19. The apparatus of claim 17, wherein the system processor is further programmed to:
   receive a response to the request for confirmation, wherein the response identifies the single matching item as incorrect;
   instruct the voice synthesis component to generate a request for additional sub category and/or item attributes; and
   store information related to the coded results including the identification of the single matching item.

20. The apparatus of claim 17, wherein the coded results indicate multiple matching items were identified, wherein the system processor is further programmed to:
   determine if there are one or more matching categories corresponding to the matching items;
   instruct the voice synthesis component to generate a request for additional voice input from the user in response to determining there are no matching categories corresponding to the matching items;
   instruct the voice synthesis component to generate a request for subcategory and/or item attributes in response to determining that there is a single matching category corresponding to the matching items; and
   instruct the voice synthesis component to generate a request for confirmation of a suitable category in response to determining that there are multiple categories corresponding to the matching items.

* * * * *